(12) United States Patent
Zhang et al.

(10) Patent No.: US 12,375,444 B2
(45) Date of Patent: Jul. 29, 2025

(54) REDIRECTION BETWEEN LOCAL AND REMOTE SYSTEMS FOR WEB BROWSERS

(71) Applicant: Omnissa, LLC, Mountain View, CA (US)

(72) Inventors: Huanhuan Zhang, Beijing (CN); Zhaohan Ren, Beijing (CN); Haiwei Zhao, Beijing (CN); Yue Sun, Beijing (CN); Xing Wei, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 62 days.

(21) Appl. No.: 18/529,612

(22) Filed: Dec. 5, 2023

(65) Prior Publication Data

US 2025/0133057 A1   Apr. 24, 2025

(30) Foreign Application Priority Data

Oct. 19, 2023   (WO) ................ PCT/CN2023/125323

(51) Int. Cl.
*H04L 29/12*   (2006.01)
*H04L 12/725*   (2013.01)
*H04L 29/06*   (2006.01)
*H04L 61/4511*   (2022.01)
*G06F 16/955*   (2019.01)

(52) U.S. Cl.
CPC ................. *H04L 61/4511* (2022.05)

(58) Field of Classification Search
CPC ...... H04L 61/4511; H04L 29/12; H04L 29/06; H04L 12/725; H04L 12/07; G06F 16/955
USPC ........................................................ 709/245
See application file for complete search history.

(56) References Cited

U.S. PATENT DOCUMENTS

| 8,863,286 | B1 * | 10/2014 | Dubrovsky | ............. G06F 21/56 726/12 |
| 2018/0331943 | A1 * | 11/2018 | Shah | ..................... H04L 45/745 |
| 2018/0331945 | A1 * | 11/2018 | Attarwala | ........... H04L 61/4511 |
| 2018/0331946 | A1 * | 11/2018 | Olofsson | ............... H04L 45/302 |
| 2020/0195688 | A1 * | 6/2020 | Prakash | .................. G06F 21/44 |

* cited by examiner

*Primary Examiner* — Jude Jean Gilles
(74) *Attorney, Agent, or Firm* — Kim & Stewart LLP (57) ABSTRACT

An example method of uniform resource locator (URL) redirection between a client device and a remote system executing a remote desktop accessed by the client device is described. The method includes intercepting, by an extension of a first web browser, a URL selected to be opened on the first web browser, the first web browser and the extension executing on a first system in communication with a second system, the first system and the second system being the client device and the remote system respectively or vice versa; forwarding, by the extension, the URL to a native process executing on the first system; determining, by the native process, an internet protocol (IP) address of the URL; forwarding the URL and the IP address to the second system; and opening, by the second system, the URL on a second web browser executing in the second system.

20 Claims, 6 Drawing Sheets

REDIRECTION BETWEEN LOCAL AND REMOTE SYSTEMS FOR WEB BROWSERS

CROSS-REFERENCE

This application is based upon and claims the benefit of priority from International Patent Application No. PCT/CN2023/125323, filed on Oct. 19, 2023, the entire contents of which are incorporated herein by reference.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers. SDDC users move through various business cycles, requiring them to expand and contract SDDC resources to meet business needs. This leads users to employ multi-cloud solutions, such as typical hybrid cloud solutions where the SDDC spans across an on-premises data center and a public cloud.

For ease of deployment, software management, and hardware cost reduction reasons, virtual machines (VMs) executing in an SDDC have been used to support virtual desktops for use in an organization in place of physical workstations. Service clients (e.g., users operating remote devices) access remote desktops executing in VMs through a service gateway.

Uniform resource locator (URL) content redirection is a feature that supports URL redirection from a remote desktop to a client, as well as from a client to a remote desktop. A user can open a URL in a web browser application running locally on the client. URL content redirection can be used to redirect the URL to the remote desktop, which can then open the URL in a web browser executing on the remote desktop. One problem with URL content redirection is obtaining the internet protocol (IP) address of the URL. Some web browsers support domain name resolution (DNS) resolve application programming interface (API) that can obtain the IP address directly from the URL (e.g., versions of the FIREFOX web browser). However, other web browsers do not support DNS resolve API (e.g., versions of the CHROME web browser or Chromium-Edge web browser). These web browsers can attempt to obtain the IP address of a URL by visiting the URL and get a response to resolve the URL IP address. However, the client can be connected to an external network (e.g., the public Internet) while the remote system executing the remote desktop may be connected to only an internal network. In such cases, the web browser executing in the remote system may not be able to visit the URL for the purpose of obtaining its IP address.

SUMMARY

In an embodiment, a method of uniform resource locator (URL) redirection between a client device and a remote system executing a remote desktop accessed by the client device includes: intercepting, by an extension of a first web browser, a URL selected to be opened on the first web browser, the first web browser and the extension executing on a first system in communication with a second system, the first system and the second system being the client device and the remote system respectively or the first system and the second system being the remote system and the client device, respectively; forwarding, by the extension, the URL to a native process executing on the first system; determining, by the native process, an internet protocol (IP) address of the URL; forwarding the URL and the IP address to the second system; and opening, by the second system, the URL on a second web browser executing in the second system.

Further embodiments include a non-transitory computer-readable storage medium comprising instructions that cause a computer system to carry out the above method, as well as a computer system configured to carry out the above method.

DETAILED DESCRIPTION

Figure 1A:
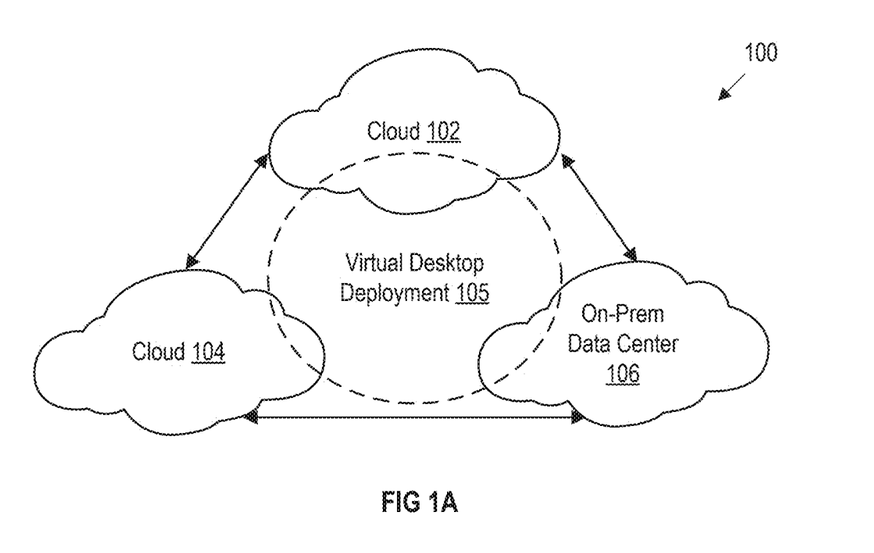
FIG. 1A is a block diagram depicting a multi-cloud system in which embodiments may be implemented.

FIG. 1A is a block diagram depicting a multi-cloud system 100 in which embodiments may be implemented. Multi-cloud system 100 includes clouds 102 and 104 and an on-premises (on-prem) data center 106. On-prem data center 106 can be a private data center or cloud managed by an organization. Although only a single on-prem data center 106 is shown, multi-cloud system 100 can include multiple on-prem data centers 106. Clouds 102 and 104 can be public clouds where the organization is a customer thereof. Although only two clouds 102, 104 are shown, multi-cloud system 100 can include one or more clouds operating as public clouds. In embodiments, multi-cloud system 100 can include only public clouds, only on-prem data centers, or a combination thereof as shown in the example (sometimes referred to as a hybrid cloud). As described below, multi-cloud system 100 can host a virtual desktop deployment 105. Virtual desktop deployment 105 includes virtual desktops executing in virtual computing instances, such as virtual machines (VMs), and a service gateway configured to provide access to the virtual desktops on behalf of users operating service clients. A virtual desktop is a preconfigured image of an operating system (OS) and applications in which the desktop environment (executing in the VM) is separated from the physical device used to access the desktop environment (the service clients). Users access virtual desktops over a network, such as the public Internet or a corporate network. Service clients include, for example, desktop computers, laptop computers, mobile devices, tablets, and the like.

Figure 1B:
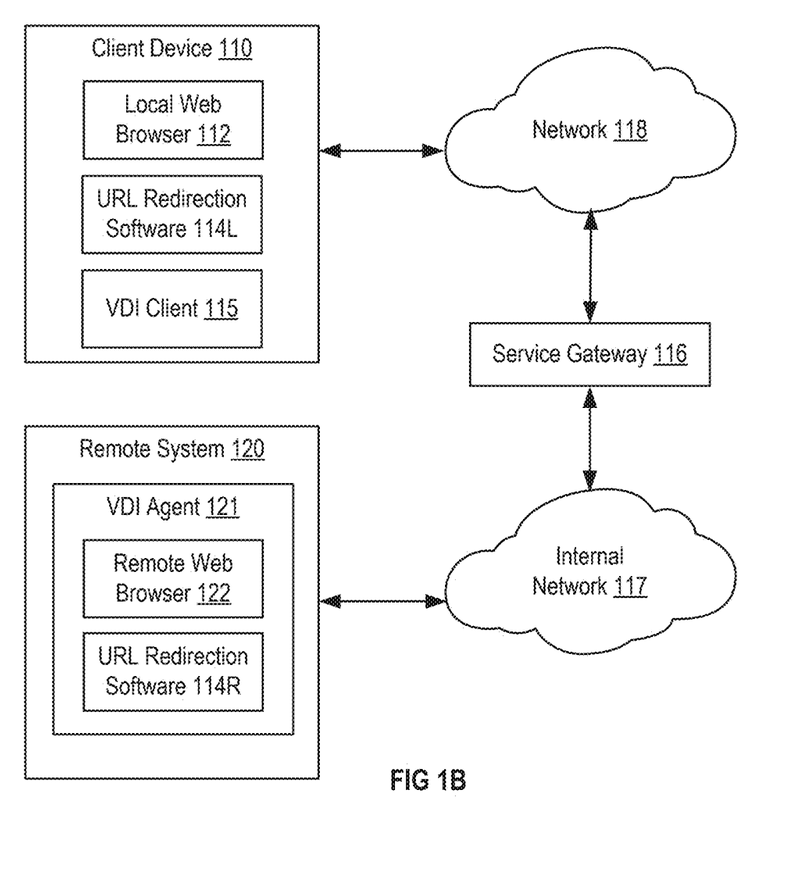
FIG. 1B is a block diagram depicting a client device in communication with a remote desktop executing on a remote system according to embodiments.

FIG. 1B is a block diagram depicting a client device 110 in communication with a virtual desktop infrastructure (VDI) agent 121 executing on a remote system 120 according to embodiments. Client device 110 communicates with a service gateway 116 over a network 118 (e.g., the public Internet). Client device 110 executes a local web browser 112, uniform resource locator (URL) redirection software 114L, and VDI client 115. Service gateway 116 provides a gateway between network 118 and an internal network 117. Remote system 120 is connected to internal network 117. Service gateway 116 facilitates connection between VDI client 115 and VDI agent 121 executing in remote system 120. Remote system 120 executes remote web browser 122 and URL redirection software 114R. VDI agent 121 facilitates a remote desktop for VDI client 115 executing on remote system 120, which includes remote web browser 122 and URL redirection software 114R.

Figure 2:
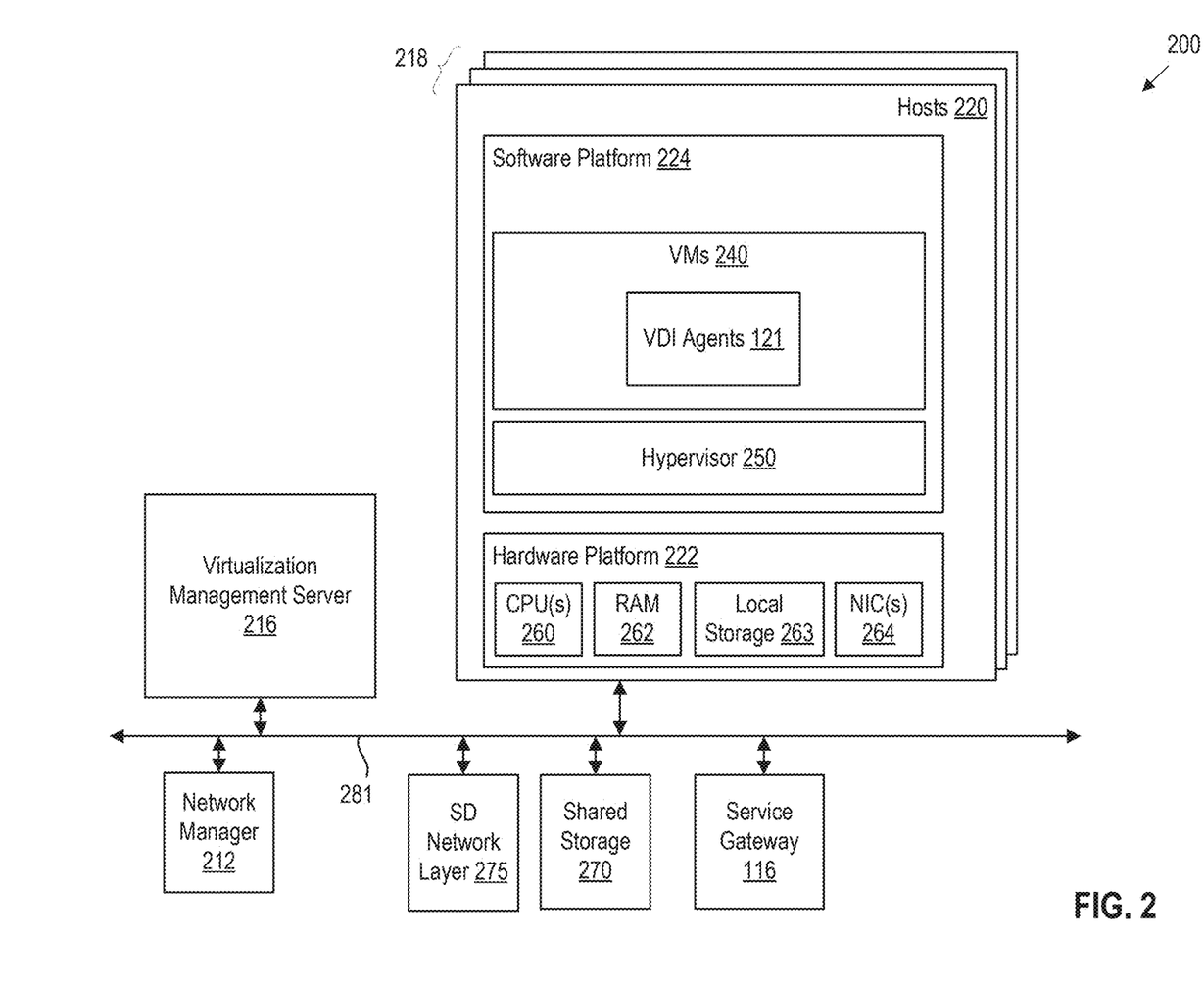
FIG. 2 is a block diagram of a virtualized computing system on which remote desktops may be executed.

FIG. 2 is a block diagram of a virtualized computing system 200 on which remote desktops may be executed. Virtualized computing system 200 includes hosts 220. Hosts 220 may be constructed on hardware platforms such as an x86 architecture platforms. One or more groups of hosts 220 can be managed as clusters 218. As shown, a hardware platform 222 of each host 220 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 220 to communicate with other devices through a physical network 281. Physical network 281 enables communication between hosts 220 and between other components and hosts 220 (other components discussed further herein).

In the embodiment illustrated in FIG. 2, hosts 220 access shared storage 270 by using NICs 264 to connect to network 281. In another embodiment, each host 220 contains a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 220 include local storage 263 (e.g., hard disk drives, solid-state drives, etc.). Local storage 263 in each host 220 can be aggregated and provisioned as part of a virtual SAN, which is another form of shared storage 270.

A software platform 224 of each host 220 provides a virtualization layer, referred to herein as a hypervisor 250, which directly executes on hardware platform 222. In an embodiment, there is no intervening software, such as a host operating system (OS), between hypervisor 250 and hardware platform 222. Thus, hypervisor 250 is a Type-1 hypervisor (also known as a "bare-metal" hypervisor). As a result, the virtualization layer in host cluster 218 (collectively hypervisors 250) is a bare-metal virtualization layer executing directly on host hardware platforms. Hypervisor 250 abstracts processor, memory, storage, and network resources of hardware platform 222 to provide a virtual machine execution space within which multiple virtual machines (VM) 240 may be concurrently instantiated and executed. One example of hypervisor 250 that may be configured and used in embodiments described herein is a VMware ESXi™ hypervisor provided as part of the VMware vSphere® solution made commercially available by VMware, Inc. of Palo Alto, CA.

Virtualized computing system 200 is configured with a software-defined (SD) network layer 275. SD network layer 275 includes logical network services executing on virtualized infrastructure of hosts 220. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes service gateway 116 to provide access between remote desktops 121 executing in VMs 240 and client devices 110.

Virtualization management server 216 is a physical or virtual server that manages hosts 220 and the hypervisors therein. Virtualization management server 216 installs agent(s) in hypervisor 250 to add a host 220 as a managed entity. Virtualization management server 216 can logically group hosts 220 into host cluster 118 to provide cluster-level functions to hosts 220, such as VM migration between hosts 220 (e.g., for load balancing), distributed power management, dynamic VM placement according to affinity and anti-affinity rules, and high-availability. The number of hosts 220 in host cluster 218 may be one or many. Virtualization management server 216 can manage more than one host cluster 218. While only one virtualization management server 216 is shown, virtualized computing system 200 can include multiple virtualization management servers each managing one or more host clusters.

In an embodiment, virtualized computing system 200 further includes a network manager 212. Network manager 212 is a physical or virtual server that orchestrates SD network layer 275. In an embodiment, network manager 212 comprises one or more virtual servers deployed as VMs. Network manager 212 installs additional agents in hypervisor 250 to add a host 220 as a managed entity, referred to as a transport node. One example of an SD networking platform that can be configured and used in embodiments described herein as network manager 212 and SD network layer 275 is a VMware NSX® platform made commercially available by VMware, Inc. of Palo Alto, CA. In other embodiments, SD network layer 275 is orchestrated and managed by virtualization management server 216 without the presence of network manager 212.

Figure 3:
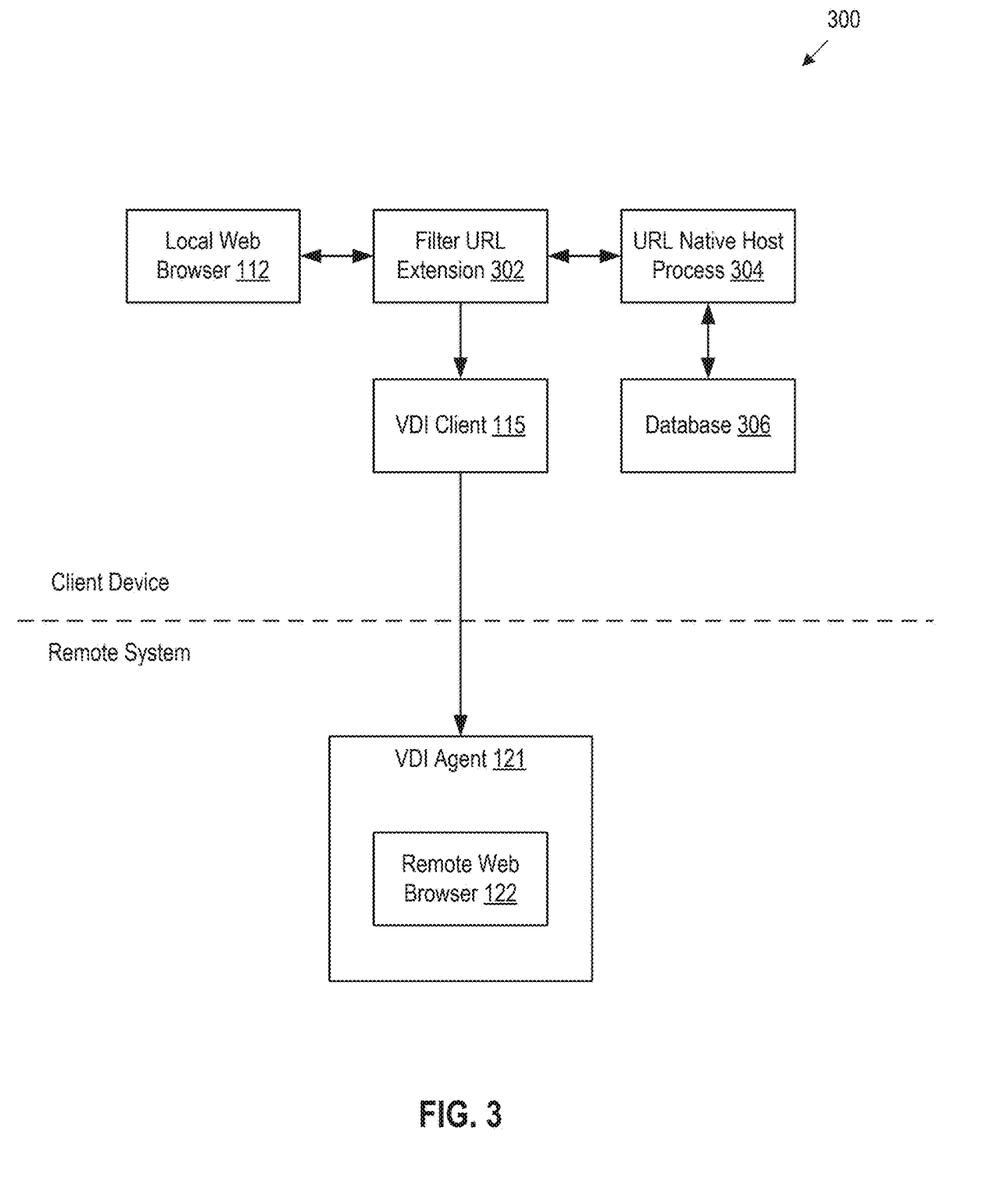
FIG. 3 is a block diagram depicting URL redirection from a client to a remote desktop according to embodiments.

FIG. 3 is a block diagram depicting URL redirection 300 from a client to a remote desktop according to embodiments. URL redirection includes local web browser 112 executing on the client device. A user interacts with local web browser 112 to open a URL. A filter URL extension 302 integrates with local web browser 112. Filter URL extension 302 hooks into the open URL function of local web browser 112 and intercepts the open function before local web browser 112 opens the URL. Filter URL extension 302 communicates with a URL native host process 304. URL native host process 304 is a process executing independent from local web browser 112. URL native host process 304 communicates with database 306. In embodiments, database 306 can be managed by the operating system of the client device (e.g., a registry or the like). URL native host process 304 is configured to perform DNS lookup of URLs provided by filter URL extension 302.

As described above, local web browser 112 may not have a DNS resolve API to get an IP address directly for an URL. Thus, filter URL extension 302 does not have access to any such DNS resolve API of local web browser 112. Thus, filter URL extension 302 communicates with URL native host process 304 to obtain the IP address of the URL. URL native host process 304 can invoke a DNS lookup to obtain the URL IP address. URL native host process 304 can also check rules stored in database 306 to determine if the URL should be redirected. Rules can be defined based on single IP addresses or IP address ranges. URL native host process informs filter URL extension 302 on whether the URL should be redirected. If so, filter URL extension 302 informs VDI client 115 to redirect the URL. VDI client 115 communicates with VDI agent 121, which in turn opens the URL on remote web browser 122. If there is no redirection, filter URL extension 302 returns the URL to local web browser to proceed with the open function.

Figure 4:
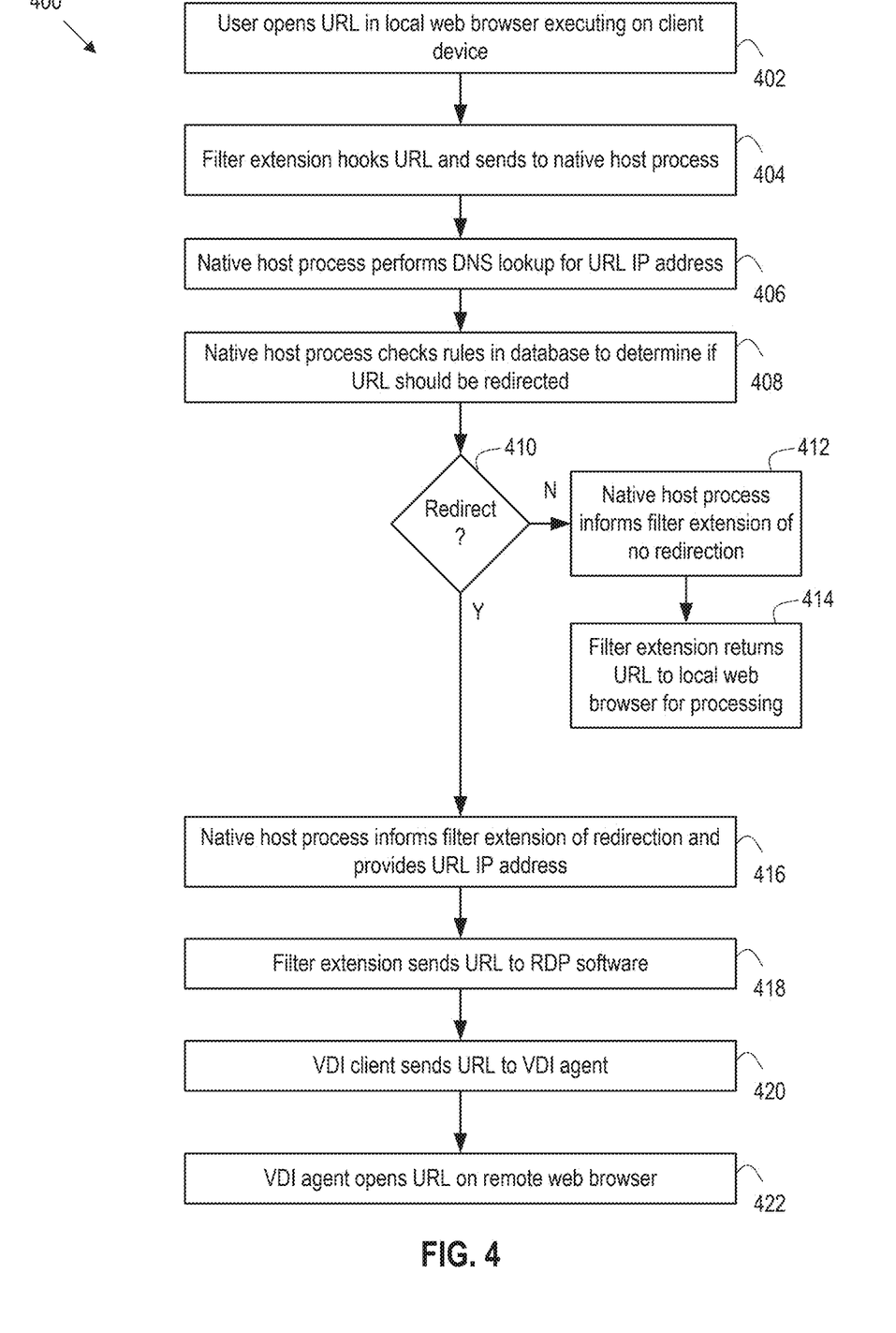
FIG. 4 is flow diagram depicting a method URL redirection from a client to a remote desktop according to embodiments.

FIG. 4 is flow diagram depicting a method 400 of URL redirection from a client to a remote desktop according to embodiments. Method 400 summarizes the process described above with respect to FIG. 3. Method 400 begins at step 402, where a user opens a URL in a local web browser executing on the client device. At step 404, a filter URL extension hooks into the open URL function of the browser and intercepts the URL. The filter URL extension sends the URL to the native host process. At step 406, the native host process performs the DNS lookup for the URL and obtains its IP address. The browser does not support a DNS resolve API and thus the extension cannot invoke such an IP of the browser to obtain the URL IP address.

At step 408, native host process checks the database to determine if the URL should be redirected based on URL redirection rules. At step 410, if the URL is not redirected, method 400 proceeds to step 412, where the native host process informs the extension that there is no redirection for this URL. At step 414, the extension returns the URL to the local web browser, which continues the open URL function to open the URL locally.

If at step 410 there is redirection, method 400 proceeds to step 416. At step 416, native host process informs the extension of the redirection and provides the URL IP address. At step 418, the extension sends the URL to the VDI client 115. At step 420, VDI client 115 sends the URL to VDI agent 121. At step 422, VDI agent 121 opens the URL on the remote web browser.

Figure 5:
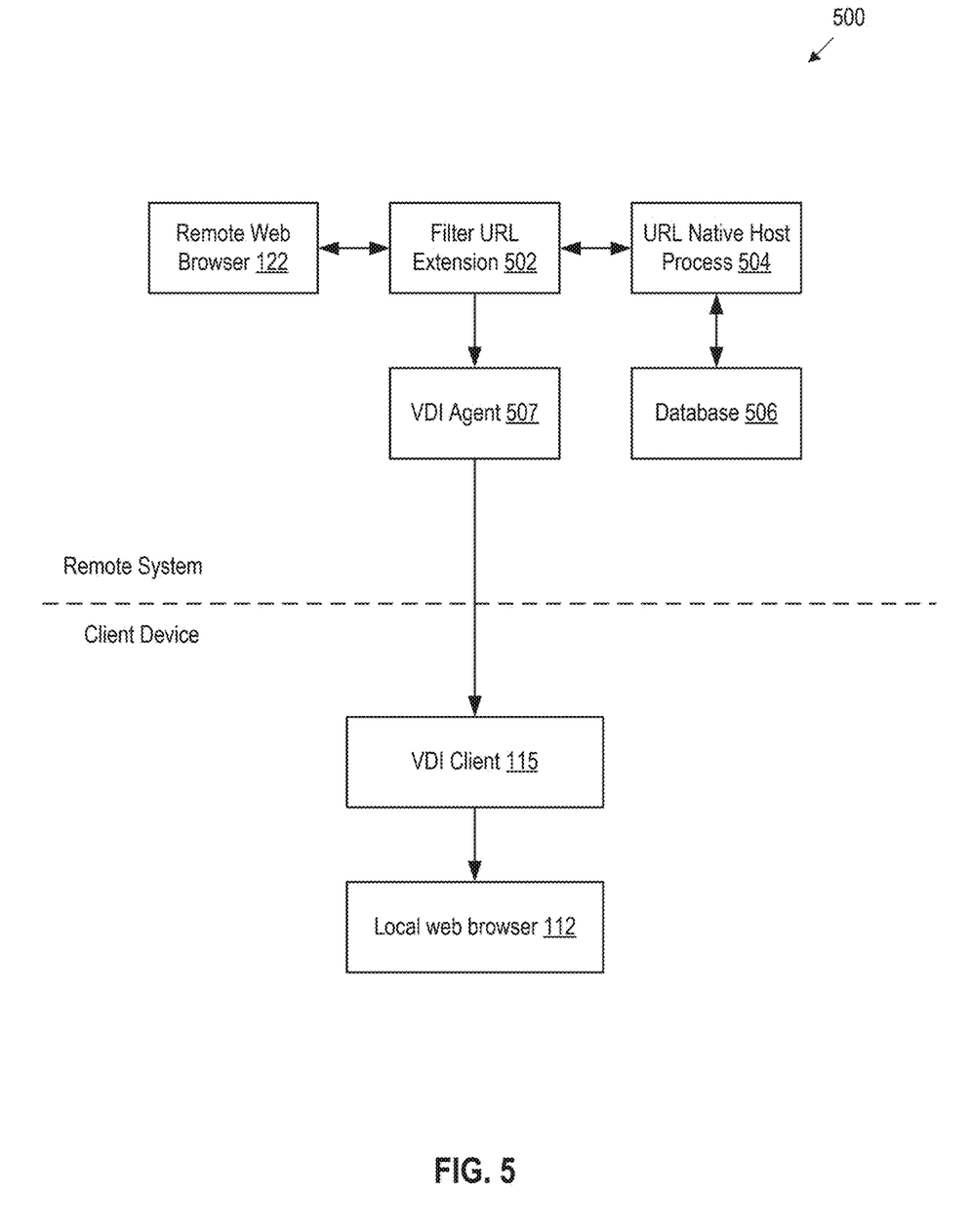
FIG. 5 is a block diagram depicting URL redirection from a remote desktop to a client according to embodiments.

FIG. 5 is a block diagram depicting URL redirection 500 from a remote desktop to a client according to embodiments. URL redirection includes remote web browser 122 executing on the remote system. A user interacts with remote web browser 122 to open a URL. A filter URL extension 502 integrates with remote web browser 122. Filter URL extension 502 hooks into the open URL function of remote web browser 122 and intercepts the open function before remote web browser 122 opens the URL. Filter URL extension 502 communicates with a URL native host process 504. URL native host process 504 is a process executing independent from remote web browser 122. URL native host process 504 communicates with database 506. In embodiments, database 506 can be managed by the operating system of the client device (e.g., a registry or the like). URL native host process 504 is configured to perform DNS lookup of URLs provided by filter URL extension 502.

As described above, remote web browser 122 may not have a DNS resolve API to get an IP address directly for an URL. Thus, filter URL extension 502 does not have access to any such DNS resolve API of remote web browser 122.

Thus, filter URL extension 502 communicates with URL native host process 504 to obtain the IP address of the URL. URL native host process 504 can invoke a DNS lookup to obtain the URL IP address. URL native host process 504 can also check rules stored in database 506 to determine if the URL should be redirected. Rules can be defined based on single IP addresses or IP address ranges. URL native host process informs filter URL extension 502 on whether the URL should be redirected. If so, filter URL extension 502 informs RDP software 507 on the remote system to redirect the URL. VDI agent 507 communicates with VDI client 115 on the client device, which in turn opens the URL on local web browser 112. If there is no redirection, filter URL extension 502 returns the URL to remote web browser 122 to proceed with the open function.

Figure 6:
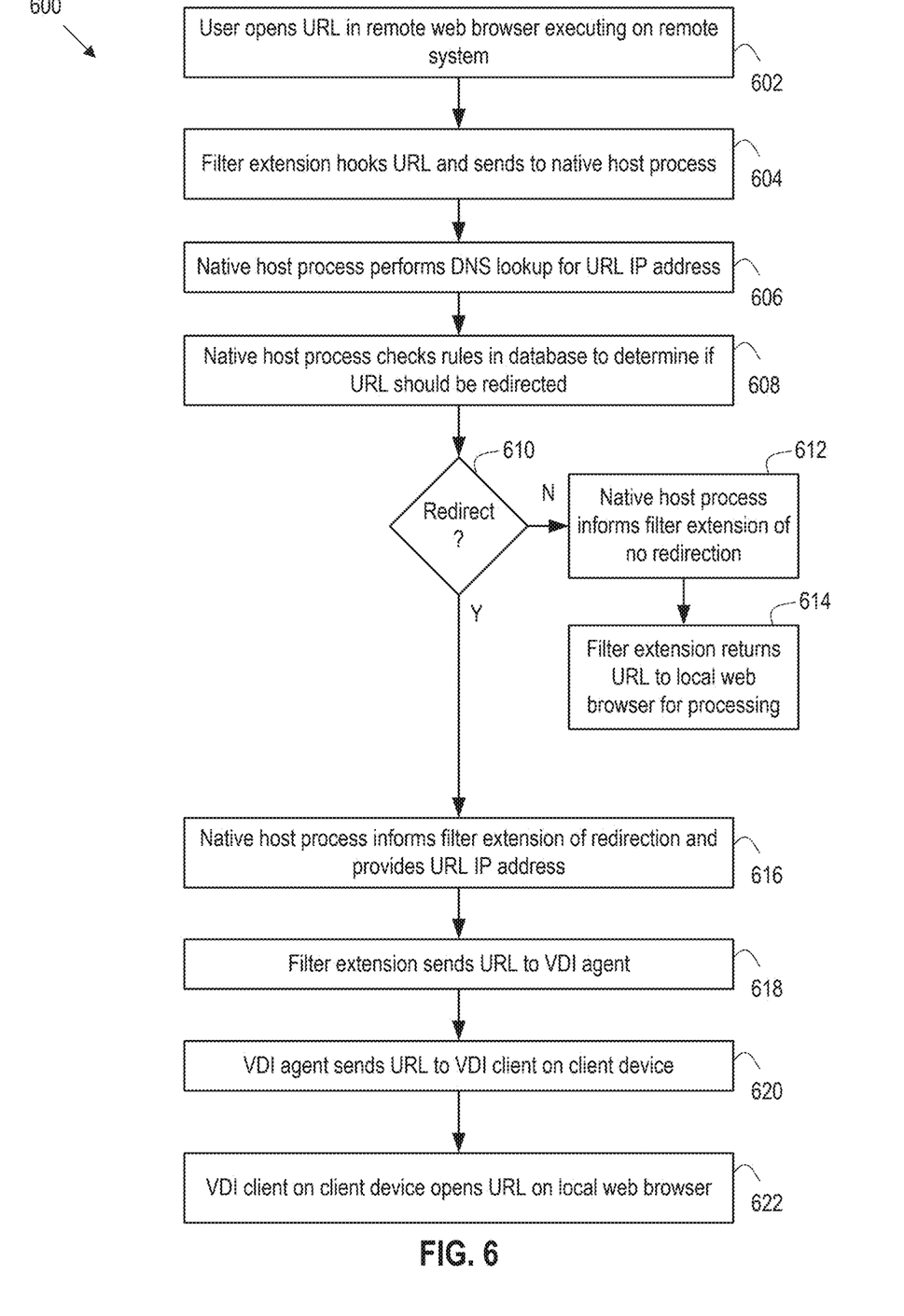
FIG. 6 is flow diagram depicting a method 600 of URL redirection from a remote desktop to a client according to embodiments.

FIG. 6 is flow diagram depicting a method 600 of URL redirection from a remote desktop to a client according to embodiments. Method 600 summarizes the process described above with respect to FIG. 5. Method 600 begins at step 602, where a user opens a URL in a remote web browser executing on the remote system. At step 604, a filter URL extension hooks into the open URL function of the browser and intercepts the URL. The filter URL extension sends the URL to the native host process. At step 606, the native host process performs the DNS lookup for the URL and obtains its IP address. The browser does not support a DNS resolve API and thus the extension cannot invoke such an IP of the browser to obtain the URL IP address.

At step 608, native host process checks the database to determine if the URL should be redirected based on URL redirection rules. At step 610, if the URL is not redirected, method 600 proceeds to step 612, where the native host process informs the extension that there is no redirection for this URL. At step 614, the extension returns the URL to the remote web browser, which continues the open URL function to open the URL locally.

If at step 610 there is redirection, method 600 proceeds to step 616. At step 616, native host process informs the extension of the redirection and provides the URL IP address. At step 618, the extension sends the URL to VDI agent 507 in the remote system. At step 620, VDI agent 507 sends the URL to VDI client 115 in the client device. At step 622, VDI client 115 on the client device opens the URL on the local web browser.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The terms computer readable medium or non-transitory computer readable medium refer to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of uniform resource locator (URL) redirection between a client device and a remote system executing a remote desktop accessed by the client device, the method comprising:
    intercepting, by an extension of a first web browser, a URL selected to be opened on the first web browser, the first web browser and the extension executing on a first system in communication with a second system, the first system and the second system being the client device and the remote system respectively or the first system and the second system being the remote system and the client device, respectively;
    forwarding, by the extension, the URL to a native process executing on the first system;
    determining, by the native process, an internet protocol (IP) address of the URL;
    forwarding the URL and the IP address to the second system; and
    opening, by the second system, the URL on a second web browser executing in the second system.

2. The method of claim 1, wherein the native process executes a domain name service (DNS) lookup of the URL to obtain the IP address.

3. The method of claim 2, wherein the native process checks at least one redirection rule stored in a database using the IP address of the URL to determine that the URL should be redirected.

4. The method of claim 1 wherein the step of forwarding the URL and the IP address comprises:
    sending, by the extension, the URL and the IP address to first virtual desktop infrastructure (VDI) software executing on the first device;
    forwarding, by the first VDI software, the URL and the IP address to second VDI software executing on the second device.

5. The method of claim 4, wherein the second VDI software sends the URL to the second web browser.

6. The method of claim 1, wherein the first web browser and the second web browser do not have an application programming interface (API) for resolving the IP address of a URL.

7. The method of claim 1, wherein the extension is integrated with the first web browser and wherein the native process is a process executing independent from the first web browser.

8. A non-transitory computer readable medium comprising instructions to be executed in a computing device to cause the computing device to carry out a method of uniform resource locator (URL) redirection between a client device and a remote system executing a remote desktop accessed by the client device, the method comprising:
    intercepting, by an extension of a first web browser, a URL selected to be opened on the first web browser, the first web browser and the extension executing on a first system in communication with a second system, the first system and the second system being the client device and the remote system respectively or the first system and the second system being the remote system and the client device, respectively;
    forwarding, by the extension, the URL to a native process executing on the first system;
    determining, by the native process, an internet protocol (IP) address of the URL;
    forwarding the URL and the IP address to the second system; and
    opening, by the second system, the URL on a second web browser executing in the second system.

9. The non-transitory computer readable medium of claim 8, wherein the native process executes a domain name service (DNS) lookup of the URL to obtain the IP address.

10. The non-transitory computer readable medium of claim 9, wherein the native process checks at least one redirection rule stored in a database using the IP address of the URL to determine that the URL should be redirected.

11. The non-transitory computer readable medium of claim 8 wherein the step of forwarding the URL and the IP address comprises:
sending, by the extension, the URL and the IP address to first virtual desktop infrastructure (VDI) software executing on the first device;
forwarding, by the first VDI software, the URL and the IP address to second VDI software executing on the second device.

12. The non-transitory computer readable medium of claim 11, wherein the second VDI software sends the URL to the second web browser.

13. The non-transitory computer readable medium of claim 8, wherein the first web browser and the second web browser do not have an application programming interface (API) for resolving the IP address of a URL.

14. The non-transitory computer readable medium of claim 8, wherein the extension is integrated with the first web browser and wherein the native process is a process executing independent from the first web browser.

15. A computer system, comprising:
a client device;
a remote system;
an extension of a first web browser configured to intercept a URL selected to be open on the first web browser, the first web browser and the extension executing on a first system in communication with a second system, the first system and the second system being the client device and the remote system respectively or the first system and the second system being the remote system and the client device, respectively;
the extension configured to forward the URL to a native process executing on the first system;
a native process executing in the first system configured to determine an internet protocol (IP) address of the URL and to forward the URL and the IP address to the second system; and
a second web browser executing on the second system configured to open the URL.

16. The computer system of claim 15, wherein the native process executes a domain name service (DNS) lookup of the URL to obtain the IP address.

17. The computer system of claim 16, wherein the native process checks at least one redirection rule stored in a database using the IP address of the URL to determine that the URL should be redirected.

18. The computer system of claim 15, wherein the forwarding the URL and the IP address comprises:
sending, by the extension, the URL and the IP address to first virtual desktop infrastructure (VDI) software executing on the first device;
forwarding, by the first VDI software, the URL and the IP address to second VDI software executing on the second device.

19. The computer system of claim 18, wherein the second VDI software sends the URL to the second web browser.

20. The computer system of claim 15, wherein the first web browser and the second web browser do not have an application programming interface (API) for resolving the IP address of a URL.

\* \* \* \* \*